(12) United States Patent
Niyogi et al.

(10) Patent No.: US 8,898,579 B2
(45) Date of Patent: *Nov. 25, 2014

(54) RANKING INTERACTIONS BETWEEN USERS ON THE INTERNET

(71) Applicant: LivingSocial, Inc., Washington, DC (US)

(72) Inventors: Sourabh Niyogi, Burlingame, CA (US); David Gentzel, Mill Valley, CA (US)

(73) Assignee: LivingSocial, Inc., Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/932,224

(22) Filed: Jul. 1, 2013

(65) Prior Publication Data

US 2013/0297623 A1 Nov. 7, 2013

Related U.S. Application Data

(63) Continuation of application No. 12/277,237, filed on Nov. 24, 2008, now Pat. No. 8,499,247.

(60) Provisional application No. 61/031,692, filed on Feb. 26, 2008.

(51) Int. Cl.
| | |
|---|---|
| *G06F 3/00* | (2006.01) |
| *G06F 17/30* | (2006.01) |
| *G06Q 30/00* | (2012.01) |
| *G06Q 10/00* | (2012.01) |
| *G06Q 30/02* | (2012.01) |

(52) U.S. Cl.
CPC ............ *G06F 17/3053* (2013.01); *G06Q 30/00* (2013.01); *G06Q 10/00* (2013.01); *G06Q 30/0255* (2013.01); *G06Q 30/0269* (2013.01)
USPC ........... 715/753; 715/733; 715/738; 705/319; 705/14.4

(58) Field of Classification Search
USPC ......... 715/700, 733, 738, 751, 753, 731, 760, 715/762, 764, 765; 707/705, 748, 751, 769, 707/770, 805; 705/14.4, 14.49, 319, 14.51, 705/14.53
See application file for complete search history.

(56) References Cited

U.S. PATENT DOCUMENTS

| | | | |
|---|---|---|---|
| 7,433,832 | B1 | 10/2008 | Bezos et al. |
| 7,970,657 | B2 | 6/2011 | Morgenstern |

(Continued)

FOREIGN PATENT DOCUMENTS

JP 2005107292 A 4/2005

OTHER PUBLICATIONS

Yan, J. et al., 'How Much Can Behavioral Targeting Help Online Advertising?' International World Wide Web Conference Committee (IW3C2), 222 2009, Madrid, Spain, Apr. 20-24, 2009, pp. 261-270, ACM.

(Continued)

*Primary Examiner* — Xiomar L Bautista
(74) *Attorney, Agent, or Firm* — Fish & Richardson P.C.

(57) ABSTRACT

A server receives an interaction history comprising a set of one-to-one interactions between a first user and other users. The server determines an interaction score for each of the interactions, wherein each interaction score is based on a type of the respective one-to-one interaction and an age of the respective one-to-one interaction. The server then determines a friend rank for each of the other users based on the interaction history, wherein the friend rank indicates a measure of a degree of influence the other users have over the first user and stores the friend rank for each of the other users. The server then receives, from a client, a request for an advertisement to display to the first user, selects one of the other users having a friend rank satisfying a predetermined threshold, and transmits, to the client, an advertisement portraying the selected additional user.

21 Claims, 13 Drawing Sheets

(56) References Cited

U.S. PATENT DOCUMENTS

| | | |
|---|---|---|
| 8,499,247 B2 | 7/2013 | Niyogi et al. |
| 2003/0177063 A1 | 9/2003 | Currans et al. |
| 2005/0114526 A1 | 5/2005 | Aoyama |
| 2006/0212305 A1 | 9/2006 | Bogle et al. |
| 2006/0271425 A1 | 11/2006 | Goodman et al. |
| 2007/0121843 A1 | 5/2007 | Atazky et al. |
| 2008/0033776 A1 | 2/2008 | Marchese |
| 2008/0109491 A1* | 5/2008 | Gupta ................ 707/104.1 |
| 2008/0140674 A1* | 6/2008 | Ishikawa ................ 707/10 |
| 2008/0147482 A1 | 6/2008 | Messing et al. |
| 2008/0189169 A1 | 8/2008 | Turpin et al. |
| 2008/0209322 A1 | 8/2008 | Kaufman |
| 2009/0006375 A1 | 1/2009 | Lax et al. |
| 2009/0119167 A1 | 5/2009 | Kendall et al. |
| 2009/0119173 A1* | 5/2009 | Parsons et al. ............ 705/14 |
| 2009/0171748 A1 | 7/2009 | Aven et al. |
| 2009/0172551 A1* | 7/2009 | Kane et al. ............ 715/733 |
| 2009/0228335 A1 | 9/2009 | Niyogi et al. |
| 2013/0055097 A1 | 2/2013 | Soroca et al. |
| 2013/0297623 A1 | 11/2013 | Niyogi et al. |

OTHER PUBLICATIONS

Non-final Office Action dated Sep. 28, 2011 in U.S. Appl. No. 12/393,795, 40 pages.

Final Office Action dated Jul. 17, 2012 in U.S. Appl. No. 12/393,795, 39 pages.

Non-final Office Action dated Jul. 24, 2013 in U.S. Appl. No. 12/393,795, 46 pages.

Non-final Office Action dated Oct. 12, 2011 in U.S. Appl. No. 12/277,237, 8 pages.

Notice of Allowance dated Jun. 19, 2013 in U.S. Appl. No. 12/277,237, 11 pages.

* cited by examiner

| Field | Type | Description | Example |
|---|---|---|---|
| user_id | Integer | Social network assigned identifier for the user in question | 1669800199 |
| md5 (user_id, friends_ids, api_key,date) | String | Prevents duplicate users | 3c468802a047 8786a6875261 2f044f9a |
| friend_ids | String | List of social network assigned friend's identifiers. | 544865472, 574120909, 581265992 |
| social_network | String | Social network where the event (interaction) takes place | FACEBOOK™, MYSPACE™, HI5™, ORKUT™, BEBO™ and others |
| interaction_type | String | Types of interaction events | Invite, Comment, Friend, Top Friend, and URL |
| verb | String | Verb specific to an application | For a food fight application, verb can be "send" |
| object | String | Object specific to an application | For a food fight application, object can be "food" |
| publisher_id | String | System assigned publisher identifier | f0eabd418799a 1107b4a6cac91 87e31b |
| api_key | String | Social network assigned application api key (or other public and standard application id) | ace3b55b37804 531f7235d4cee 81aab0 |
| date | Date | Date when the event takes place. | 2008-07-08 |
| timestamp | Integer | Timestamp when the event takes place | 1234353535 |
| URL | String | URL to denote different types of actions (verbs) | |
| recipient_count | Integer | Number of recipients | 15 |

FIG. 8

RANKING INTERACTIONS BETWEEN USERS ON THE INTERNET

CROSS-REFERENCE TO RELATED APPLICATIONS

This application is a continuation application of and claims priority to U.S. application Ser. No. 12/277,237, filed on Nov. 24, 2008, which application claims the benefit of U.S. Provisional Application Ser. No. 61/031,692, filed on Feb. 26, 2008, the contents of which applications are incorporated by reference herein.

BACKGROUND

1. Field of Art

The present disclosure is directed to determining the degree of influence users have on each other based on their interactions.

2. Description of Related Art

With the changing trend in the use of World Wide Web technology that aims to enhance creativity, information sharing, and, most notably, collaboration among users, there has been an evolution of web-based communities and hosted services in the form of social media. Social media is an umbrella term for activities that enable people to interlink and interact with engaging content in a conversational and participatory manner via the Internet. In essence, social media is used to describe how people socialize or interact with each other throughout the World Wide Web.

Social media include social networks where users build profiles and friend lists, photo sharing websites, instant messaging applications, web-based email, retail sites where users can share wish lists, wedding planning sites that allow users to create personalized pages to share information about a wedding with guests, and combinations of several of these. Some social media, including social networks, have created open platforms so that external developers can write applications that use data captured by social media.

Advertising on the internet conventionally maximizes the effective cost per thousand impressions (eCPM) where each ad has some bid, eCPM (e.g., a calculation that reveals how much each thousand units of an advertisement inventory costs an advertiser such as campaign cost divided by number of thousand advertisement units). The ranking of advertising is computed by multiplying bid eCPM's by quality scores. The ads with the highest ad rank are given preferential treatment. In the case of advertising opportunities where only one ad is displayed, preferential treatment means the highest rank ad is displayed more often than lower ranking ads. In a situation where multiple ads are displayed, preferential treatment means the ad is displayed more prominently than the others.

Currently, various applications allow for users to invite their friends on a social network to participate in the application and interact with their friends through that application. All of this information is logged by the social network. Advertisements are displayed to users of social networks but are only conventional internet advertisements.

SUMMARY

A system and method for collecting information about interactions users have with each other on the internet is disclosed. Further, a method is provided determining which other users are most influential for a given user, an influence rank. Using data from the social network and data gathered by social applications, advertising networks can improve both their web advertising display and advertising selection algorithms to show more engaging social advertising to users. The determination of the degree of influence of a first user on a second user is useful for providing information that is meaningful to the second user.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF THE DRAWINGS

The disclosed embodiments have other advantages and features which will be more readily apparent from the detailed description, the appended claims, and the accompanying figures (or drawings). A brief introduction of the figures is below.

FIG. 8 illustrates, in a table, the data fields in the record of an interaction according to one embodiment.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimable subject matter.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Architecture

Figure 1:
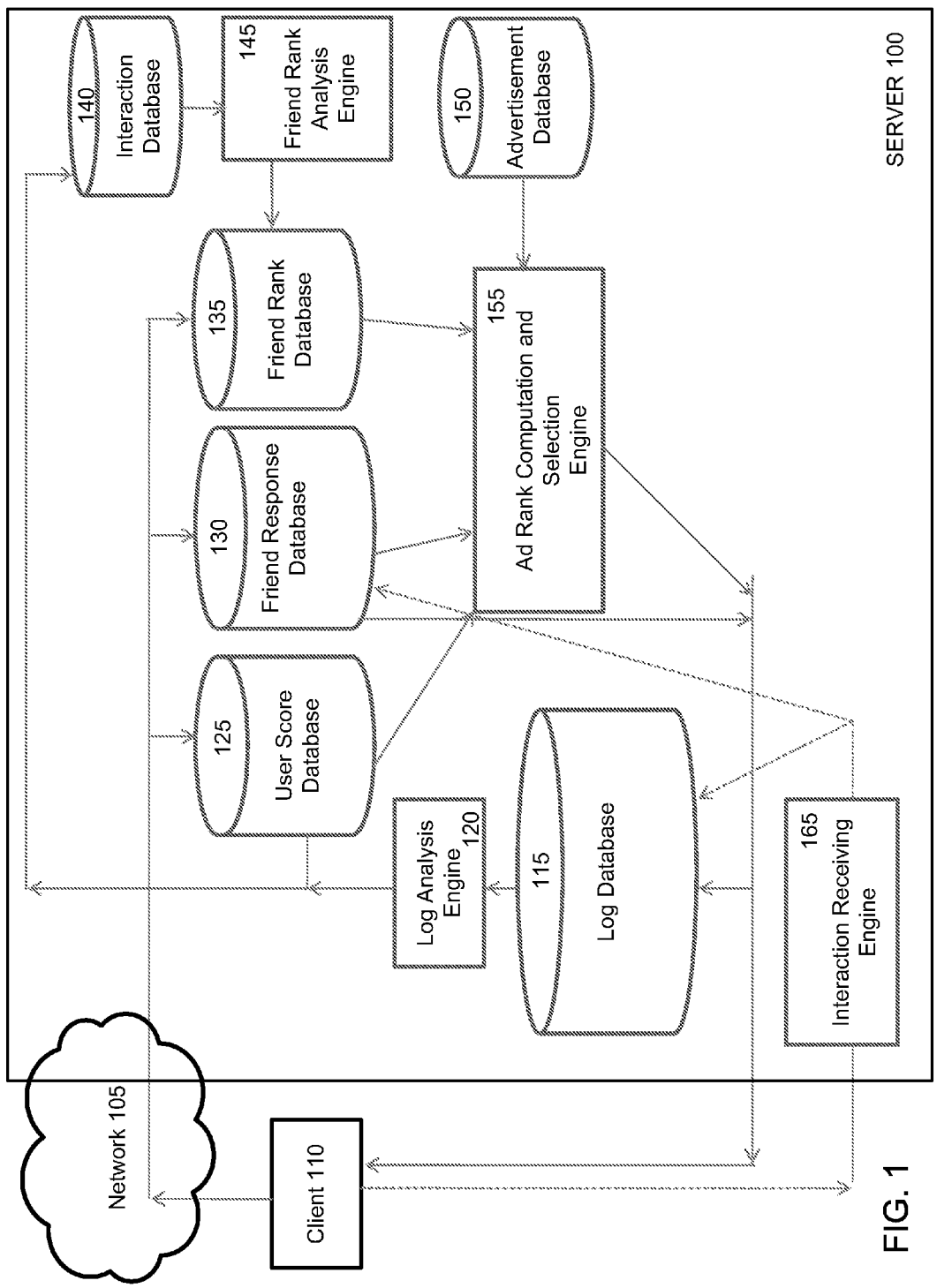
FIG. 1 illustrates a system architecture according to one embodiment.

FIG. 1 is a depiction of the system architecture and process flow according to one embodiment. The system comprises a client 110 and a server 100 which communicate via the network 105. The server 100 comprises a log database 115, log analysis engine 120, user score database 125, friend response database 130, friend rank database 135, interaction database 140, friend rank analysis engine 145, advertisement ("ad") database 150, ad rank computation and selection engine 155, and an interaction receiving engine 165. For simplicity and ease of discussion, only one server 100 is shown. However, it is noted that in practice there may be multiple servers 100 configured to function together as described herein.

The client 110 is a browser on a computing device. The browser is any browser known in the art, for example, MICROSOFT INTERNET EXPLORER™ or MOZILLA FIREFOX™. The computing device is any computing device, including mobile computing devices, known in the art, for example, a personal computer, a notebook computer or a smart phone. For simplicity and ease of discussion, only one client 110 is shown. It is noted however, that the disclosed configuration functions with numerous clients 110 communicating with the server 100. The network 105 is any network, wired or wireless known in the art, for example, the Internet.

The log database 115 stores the actions of users before and after viewing an ad: the history of the user's browser being sent an ad, the history of the user's browser having received an ad, the user interacting with an ad through mouseover or click events, and post-click activity on web pages, such as filling out a form, making a purchase, or installing an application. The log database is populated by the interaction receiving engine 165 which reviews traffic from the user at the client 110 for interactions with friends.

The log analysis engine 120 determines a score for each user, s(U). This score comprises an aggregate of the user's behavior in response to events that have been logged in the log database 115. The score for each user is how much more likely the user is to click on social advertisement. A social advertisement is one that portrays a friend of the user from the social network. This score is determined by analyzing the behavior of the user in reference to ads previously shown to the user.

The user's score is determined from the combination of two groups of measurements. The first group includes summary statistics of how a particular user responds to social advertisements. Specifically, the first group statistics include:
  (i) # of impressions of social ads shown to a user, across all friends, over a pre-determined time period of N days;
  (ii) # of "interactions" generated by social ads for impressions of (i);
  (iii) # of clicks to an advertiser landing page for impressions of (i);
  (iv) # of actions after the landing page for impressions of (i);
  (v) interaction rate computed from (i) and (ii);
  (vi) clickthrough rate computed from (i) and (iii);
  (vii) conversion rate computed from (i) and (iv).

The second group includes summary statistics of how all users respond to social advertisements. Specifically, the second group statistics include:
  (i)' # of impressions of social ads shown to all users, across all friends, over a pre-determined time period of N days;
  (ii)' # of "interactions" generated by social ads for impressions of (i);
  (iii)' # of clicks to an advertiser landing page for impressions of (i);
  (iv)' # of actions after the landing page for impressions of (i);
  (v)' interaction rate computed from (i) and (ii);
  (vi)' clickthrough rate computed from (i) and (iii);
  (vii)' conversion rate computed from (i) and (iv).

In one embodiment, the user's score is a function of the ratio of the user's interaction rate, v, to all users' interactions rate, v'. Alternatively, the user's score is a function of the ratio of the user's clickthrough rate, vi, to all users' clickthrough rate, vi' or in yet another alternative, the user's conversion rate, vii, to all users' conversation rate, vii'. Which of these ratios is used depends on the method of selling the advertisements.

For advertisements that are sold per impression or per interaction, the user score is based on the interactions, v, for advertisements sold per click, the user score is based on the clickthrough rate, vi, and for advertisements sold per action, the user score is based on the conversion rate, vii. The function applied to the ratio is the identity function but it is contemplated that a sigmoid function can be used. The scores for users are stored in the user score database 125. Determination of user scores by the log analysis engine 120 may occur asynchronously from the choosing and displaying of an ad to a user. It is contemplated that user scores are updated at predetermined intervals. For example, they may be updated once a day, once a week or once a month.

It is noted that there may be instances in which there is not enough information known about a particular user for a user score to be a valid predictor. In such an instance any probabilistic technique can be employed, such as Gibbs sampling, which considers the user score to be a random variable.

The friend response database 130 stores the responses that users have gotten from friends from various interactions. This database may assume any number of forms, such as a relational database, a memory-based key-value pair storage system, or flat file format for rapid lookup. In a preferred embodiment, a memory key-value system is loaded with a set of flat files built from a relational database of interactions. The friend rank analysis engine 145 computes the ranking of a user's friends, the friend rank. The operation of the friend rank analysis engine 145 is discussed in greater detail with reference to FIG. 2.

The ad database 150 stores the advertisements bidding to be displayed to users. The ad database 150 stores data fields that pertain to the advertisements which include an identifier for the advertisement, the group to which it belongs, the cost of the bid, the cost type and the daily budget for that advertisement.

The ad rank computation and selection engine 155 determines rank of advertisements by adding to the calculation, the friend rank for the friends of the user to whom an ad will be displayed. The friend rank is a measure of the degree of influence a given friend has on a user, also an influence rank. Determination of the ad rank comprises:

Ad Rank'=eCPM*Quality Score1*friend rank

In an example: Friend ranks for a user U1 who has 3 friends F1, F2, F3 responding to ads A1 and A2 is:

| User U | Friend B | Ad | Friend Rank (U, B) |
|--------|----------|-----|--------------------|
| U1 | F1 | A1 | 1.5 |
| U1 | F2 | A1 | 3.2 |
| U1 | F1 | A2 | 1.6 |
| U1 | F3 | A2 | 0.9 |

In aggregate form, this would be:

| User U | Friends | Ad | Ad Rank(A) |
|--------|---------|-----|------------|
| U1 | F1, F2 | A1 | Bid eCPM(A1) × f(1.5, 3.2) |
| U1 | F1, F3 | A2 | Bid eCPM(A2) × f(1.6, 0.9) |

That is, given friend rank data for specific response ads from friends, the ad ranks for specific ads can be computed from the individual responses using a combinator f, e.g., the max, geometric mean, arithmetic mean, etc. Given such combinatory function and individual friend ranks between users, the ad ranks used in eCPM auctions are augmented to include the friend rank data.

The ad with the highest ad rank as computed by process described previously is displayed to the user at the client 110. Interactions that result from the user being displayed an ad featuring one of the user's friends is logged in the interaction receiving engine 165.

Figure 2:
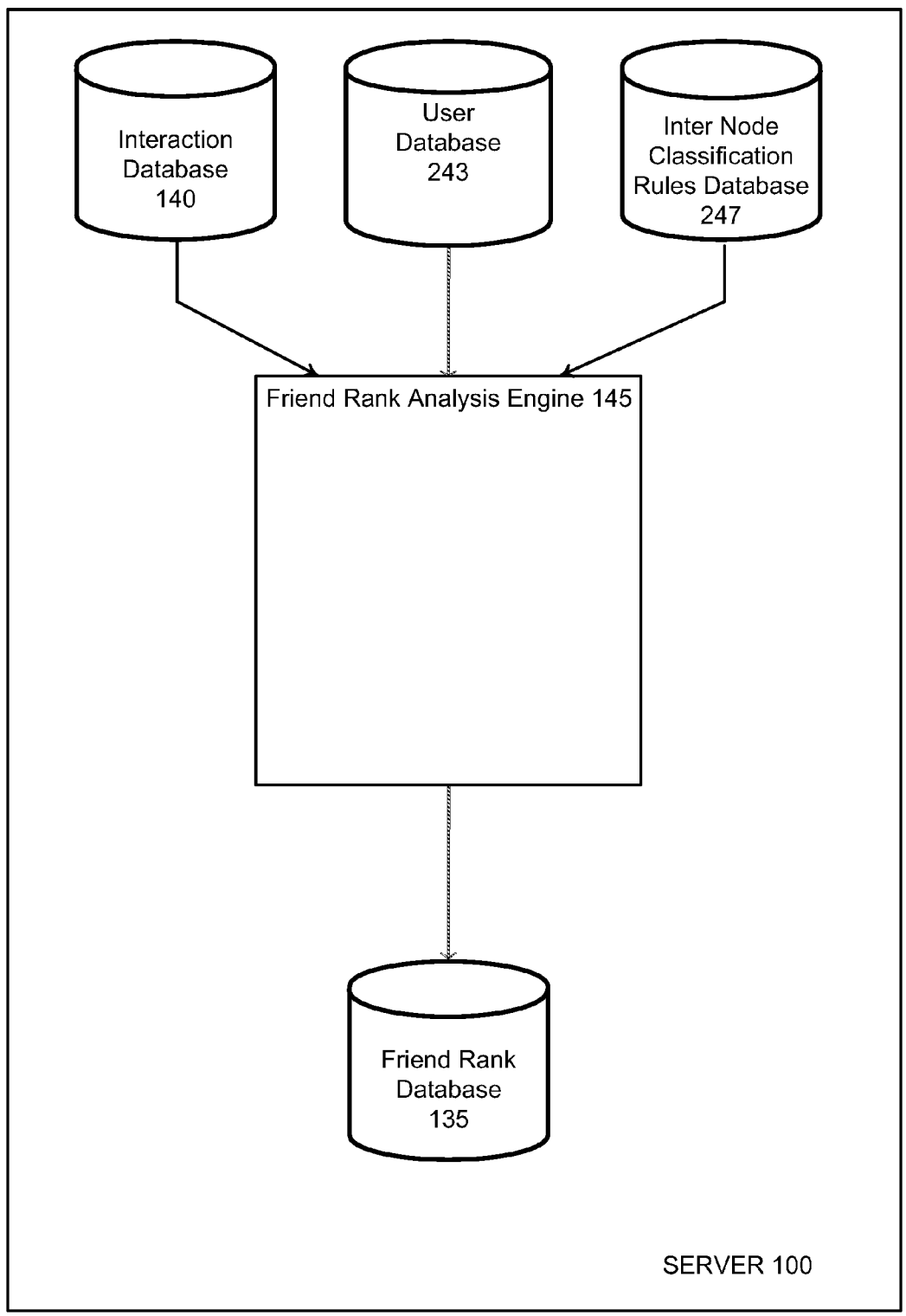
FIG. 2 illustrates a system architecture around the friend rank analysis engine according to one embodiment.

FIG. 2 illustrates a system architecture and process flow of the friend rank analysis engine 145, which determines the friend rank component of the ad rank, according to one embodiment. Information used by the friend rank analysis engine 145 is stored in the interaction database 140, the user database 243, and the inter node classification rules database 247. The friend rank of a given user's friends is determined by analyzing the interactions the user has with those friends. Friends of a user are other users with whom the user interacts on the internet. Friends include users for whom the first user has email addresses in an online address book. Online address books include address books at email applications such as YAHOO! MAIL™ and GMAIL™. Online address books also include address books stored at websites from which a user sends links to other users. An example is KODAKGALLERY™. Friends also include other users that the first user has designated as a friend in a social network such as FACEBOOK™ and MYSPACE™. The analysis comprises determining an interaction score for the interactions and from that, determining a rank for each of the user's friends. When friend rank is used for providing advertisement, it is a statistical indication of how much more likely a user is to click on a social advertisement given that it indicates the advertisement is directed from a specific friend.

Metadata about interactions between a user and the user's friends are stored in the interaction database 140. This metadata is used in part for determining the interaction score. Metadata stored about a given interaction includes the social networking site at which the interaction occurred; the application via which the interaction occurred; the publisher of the application, if applicable; the type of interaction; what the interaction was; the user(s) involved; date and time of the interaction; and how many recipients there were of the interaction.

In one embodiment, there are five types of interactions: 1) an invite, 2) a comment, 3) a friend, 4) a top friend, and 5) URL. These types of interactions do not need to be specific to a given social networking site or an application with which users interact with their friends.

An invite is when a user sends an invitation to another user to join the current application from within the application, or when one user interacts with another user inside an application using a pre-fabricated invitation form provided by the social network or by the application. Examples include inviting a user to install the SUPERPOKE™ application by Slide, Inc. (sending an invitation) or sending a drink to a friend in HAPPY HOUR!™ by 42 Friends LLC using the pre-fabricated invitation form (user interaction). The SUPERPOKE™ application is available to users of FACEBOOK™ as well as MYSPACE™. Additionally, an invite includes sending a link to an article at a news website to a friend.

A comment is a publicly visible note left by one user at another user's profile. Social networking examples include writing on another user's "wall" on FACEBOOK™ or writing on another user's "comment board" on MYSPACE™. Additional examples include leaving a message on a blog and a comment for a user's photo at a photo sharing site.

A friend is another user with whom the first user has a mutually accepted relationship. Such a relationship can be terminated by either party at any time. For example, on FACEBOOOK™, a user requests to become a friend of another user. The other user will either accept or reject that request. Similarly, users of AMAZON.COM™ can request that another user of AMAZON.COM™ become a friend. For example, being the friend of another user may give more access to the other user's profile.

A top friend is a designation of the favored friends among the user's friends. This is usually a one-directional relationship with the potential for reciprocation. In one embodiment, a top friend is indicated through the application, TOP FRIEND SPHERE™, by Jesse Shaw and Luke Rice. The user installs this application on the user's profile at the user's social network and through the application, designates friends as being top friends.

A URL interaction is an interaction which is evidenced by HTTP_REFERER uniform resource locator ("URL") attributes available when serving advertisements to users. Such events include a user visiting another user's page at a social networking site or visiting a user's blog.

The metadata stored in the interaction database 140 for a given interaction is stored in a uniform format so that the entries are comparable across the various contexts in which interactions occur on the internet. The data fields for an interaction according to one embodiment are shown in the table of FIG. 8. Not all interactions have metadata that corresponds to all of the data fields.

Turning to the table shown in FIG. 8, for an example interaction of a user "throwing a sheep" at friends using the SUPERPOKE™ application in the MYSPACE™ social network, the characteristics shown in the table of FIG. 8 are now described. The SUPERPOKE™ application allows users to greet each other by "throwing" various objects at each other. The metadata would be determined to be as follows. The user_id is the identifier for the user initiating the interaction, as assigned by MYSPACE™. The md5 is a string made up of the user_id, the friend_ids, api_key and date. This is used to compare to other entries and avoid duplication of users. There are various sources from which metadata about interactions can be obtained and these various sources may contain the same interactions. It is then possible to have duplicate entries when interactions and corresponding metadata is obtained from multiple sources. The friend_ids are the identifiers of the friends at whom the first user is throwing the sheep. They are the identifiers assigned to those users by MYSPACE™. The social_network is MYSPACE™ The interaction_type is invite. The verb would be send as this particular interaction is analogous to sending a drink or a flower. The verb genericizes the interaction so that it is comparable to similar interactions in other applications. It is not necessary to use the very verb used in the application and shown to the user to describe the interaction. In this case, that verb would be "throw." The object is the item in the interaction which is a sheep. The verb and object provide additional information about the interaction The publisher_id is the identifier for the publisher of the application as assigned by system. The api_key is the identifier for the application, in this case SUPERPOKE™, as assigned by MYSPACE™ The date is the date on which the interaction took place. The timestamp is the time at which the interaction took place. The URL is the HTP_REFERRER of the page from which the interaction was initiated. The recipient_count are the number of recipients of the interaction. If the user threw the sheep at 5 friends, the recipient_count is 5.

As can be seen from the table in FIG. 8, one of the characteristics of an interaction is how many recipients received the interaction from the user. When an interaction involves more than two parties, the interaction is first serialized to make a series of interactions, each one involving only two parties. For example, if User 1 invited Friends A, B, and C to join User 1 in a game, that one interaction becomes three entries for User 1, with each one of Friends A, B and C.

In one embodiment, the friend rank for the user's friends is determined using weighted sums of counts of interaction data for each one-to-one interaction the user has using Formula (I).

$$r(U, F) = \frac{\sum_{i=1}^{n} w_i c_i(U, F)}{\sum_{x} \sum_{i=1}^{n} w_i c_i(U, x)} \quad (I)$$

wherein: $c_i(U,F)$ is a count of one type of interaction between a given user, U, and a given friend, F, N=number of different types of interactions, x is any one of the user's friends, and $w_i$ is the weight given to each type of event.

Each event type is given a weight, $w_i$. In one embodiment, a message and an invitation both have a weight of 0.1, the sending of a gift using the gift application of the social network has a weight of 0.2, and an interaction via a social advertisement has a weight of 0.5.

Figure 3:
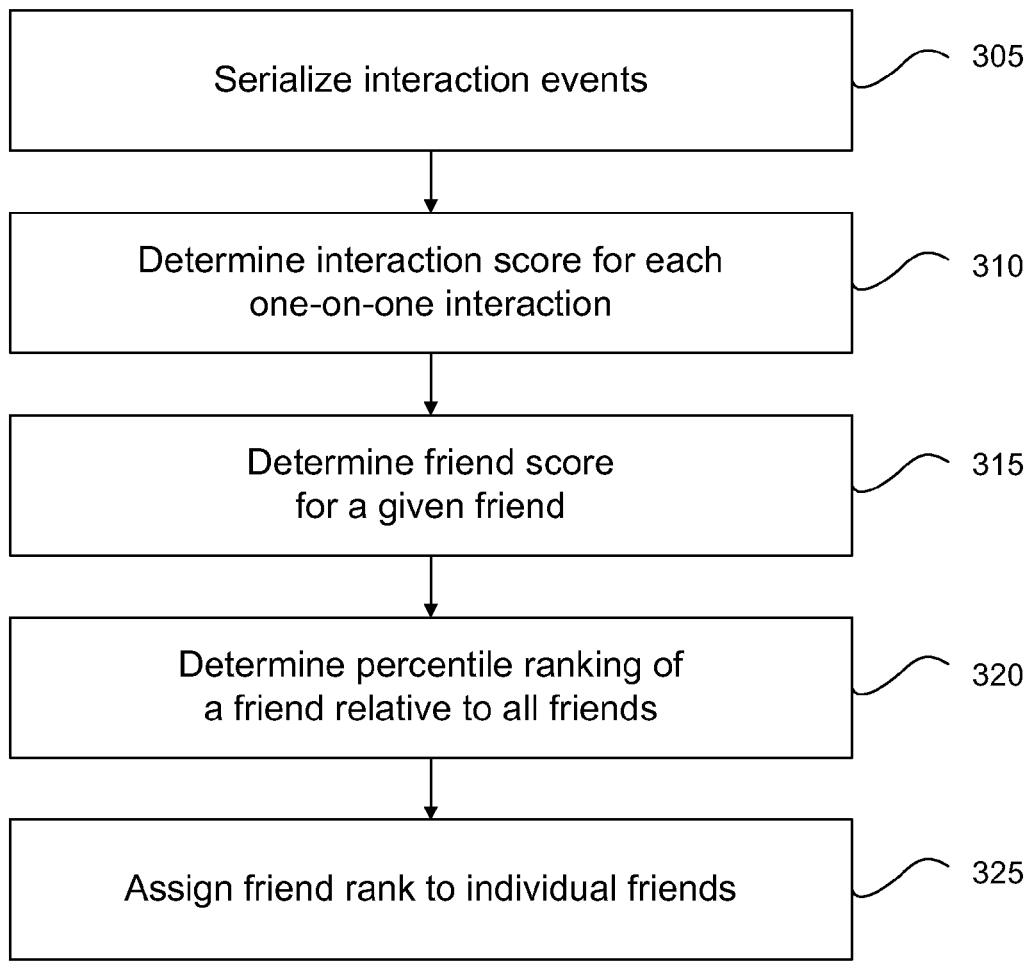
FIG. 3 is a flow chart illustrating the determination of friend rank according to one embodiment.
Figure 5:
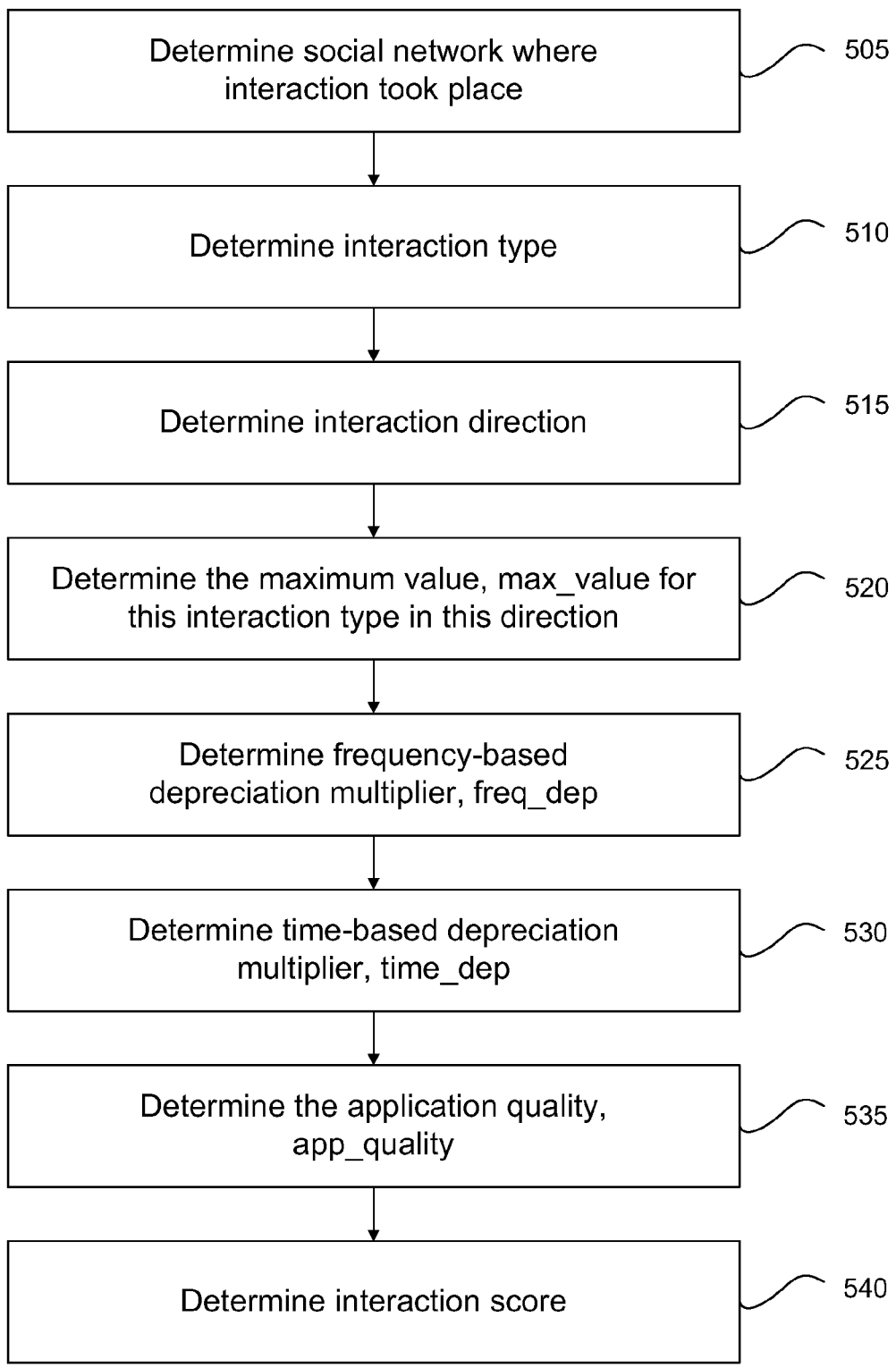
FIG. 5 is flow chart illustrating the determination of an interaction score according to one embodiment.

In another embodiment, described in reference to FIG. 3, after serializing 305 the interaction events as described previously, an interaction score is determined 310 for each one-to-one interaction for the user and the friend and takes into account additional factors such as the age of the interactions. The longer ago the interaction took place, the less weight it is given in ranking the friend with which the user had the interaction. The steps for determining the interaction score are described further in reference to FIG. 5.

Figure 4:
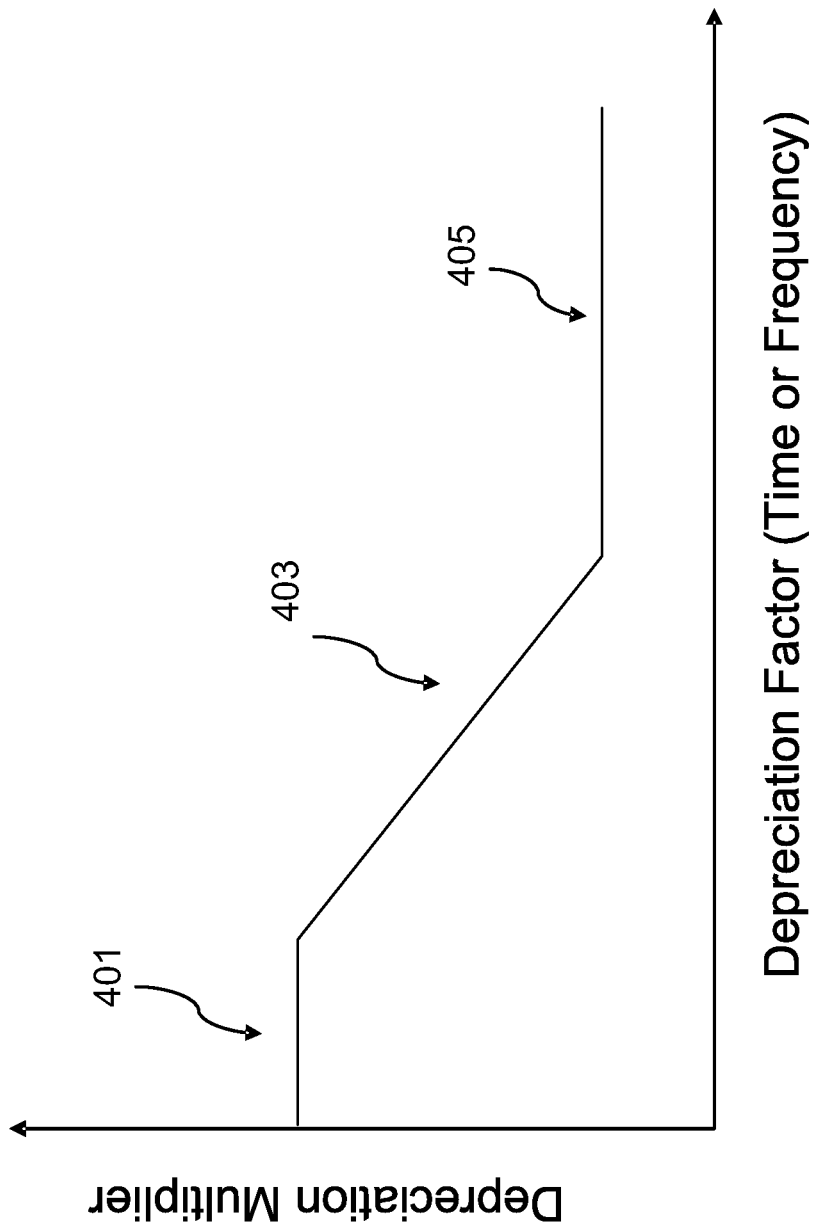
FIG. 4 illustrates the reduction in the multiplier for the interaction score as a factor of time or frequency according to one embodiment.

To determine the depreciated value for a given interaction, a multiplier is calculated. The maximum value for the multiplier is 1 and the minimum value is 0. FIG. 4 illustrates the reduction in the value of the multiplier as a factor of time or frequency according to one embodiment. There are three variables that factor into the calculation of the multiplier for a given type of interaction taking place within a given social network: 1) the cliff 401 or how long the interaction score maintains its maximum value prior to beginning to depreciate, 2) the speed 403 indicates how long it takes for full depreciation to occur, and 3) the floor 405 or the minimum multiplier that will be applied to the interaction score at its fully depreciated value. The cliff 401, speed 403 and floor 405 can be unique to not just a given interaction in a given network but to any combination or sub-combination of the characteristics of an interaction.

Alternatively, an interaction depreciates based on the frequency of the interaction. Rather than the cliff 401 and speed 403 being measured in a unit of time, they are measured in repetitions of the interaction. Consider an application through which a user can communicate with a friend publicly. One such example is the "wall" at FACEBOOK™ on which a user writes a message to a friend. This "wall" is specific to a user and is visible to all of the friends of that user. The interaction of placing a comment on a FACEBOOK™ user's wall maintains maximum value only until that user has placed two additional comments on the first user's wall regardless of whether the two additional comments were made one hour or one week after the first comment.

In yet another embodiment, a combination of depreciating by time and depreciating by frequency is used. In such an embodiment, the interaction score for placing a comment on a user's FACEBOOK™ wall can retain its maximum value for two repetitions or two weeks, whichever comes first.

A calculation for the multiplier is not required when the interaction takes place during the cliff 401 period nor when the interaction takes place after full depreciation. Rather the calculation is used when the interaction is actively depreciating. The speed 403 includes the cliff 401 period. Therefore to determine how long an interaction is actively depreciating, the cliff 401 is subtracted from the speed 403. For interactions during active depreciation, the formula for calculating the depreciation multiplier is:

$$1-[((t-\text{cliff})/(\text{speed}-\text{cliff}))*(1-\text{floor})]. \quad \text{II}$$

Here, t is the time of the interaction for time-based depreciation or the repetition number for frequency-based depreciation.

Example 1

An interaction depreciates over time. For example, the interaction of sending a friend a link to an article from a news website, such as CNN™, may retain its value as an indicator of how influential the friend is to the user for 4 weeks. The value depreciates over the following four weeks but this type of interaction always retains some value. In this example, for time-based depreciation, the interaction is always worth at least 20% of the maximum value. The relevant variables would then be cliff=4 weeks, speed=8 weeks, and floor=0.20. Therefore, active depreciation takes place from weeks 5 to 8. For an interaction taking place in week 5 (t=5), which is during the time of active depreciation, the calculation, based on (II), is as follows: $1-[((5-4)/(8-4))*(1-0.20)]=0.80$.

Example 2

An interaction depreciates with repetition. It may be determined that how many times the user has invited a friend to play PATHWORDS™ since the invitation being evaluated is also relevant to determining the value of that interaction to how influential the friend is to the user. For example, the value of the interaction is retained for two repetitions, then depreciates for 8 more repetitions but is not worth less than 50% of the maximum value. The relevant variables would be cliff=2 times, speed=10 times, and floor=0.50. Therefore, active depreciation takes place from repetitions 3 to 8. For an interaction taking place for the fourth time, the multiplier would be calculated, based on (II), as follows: $1-[((4-2)/(10-2))*(1-0.50)]=0.875$.

Depreciation rates for a given interaction at a given social network are determined by the inter node classification rules. The inter node classification rules are rules determined from statistical analysis of interaction data from social media and are stored in the inter node classification rules database 247. Alternatively, the inter node classification rules are programmed manually. Inter node classification rules include characteristics of interactions. For example, the inter node classification rules for a "friend" in FACEBOOK™ include the maximum value of the interaction score, depreciation over time, depreciation by frequency, and that it denotes friendship. Additionally, there are inter node classification rules specific to a social network or to a given application such as its quality. Application quality is programmed into the rules. It is a multiplier having a value of 0 to infinity. In one embodiment, if no application quality is programmed for a particular application, the quality factor in the interaction score calculation is set to 1. The inter node classification rules may be updated periodically as it is expected that trends in interactions among users of social media will change over time.

Example 3

Determining an interaction score. The collected metadata may be combined into an interaction score. Consider the example of the sixth invitation from a FACEBOOK™ user to a friend and the invite takes place 7 weeks prior to the determination of the score. The interaction score is determined for the first user initiating the invitation. The example is described with reference to FIG. 5. The social network is determined 505 to be FACEBOOK™ and the interaction type is determined 510 to be an invite. The variables for use in equation II can now be determined. For an outgoing invite, the maximum value (max_value) of the interaction score is determined 520, from the inter node classification rules, to be 4. The inter node classification rules contain the cliff, speed and floor for frequency-based depreciation as well as time-based depreciation for this interaction. For frequency-based depreciation they are cliff=5, speed=10 and floor=0.25 and for time-based depreciation, they are also cliff=5, speed=10 and floor=0.25. Based on (II), the frequency-based depreciation multiplier (freq_dep) is then determined 525 to be $1-[((6-5)/(10-5))*(1-0.25)]=0.85$. Also based on (II), the depreciation multiplier based on time (time_dep) is determined 530 to be $1-[((7-5)/(10-5))*(1-0.25)]=0.70$. The application quality for FACEBOOK™ is not known in the inter node classification rules and therefore, this factor is determined 535 to be 1. The interaction score 540 is determined from:

$$(max\_value)*(freq\_dep)*(time\_dep)*(app\_quality) \quad (III)$$

For this interaction, the interaction score, based on (III) is $(4)*(0.85)*(0.70)*(1)=2.38$.

The direction of the interaction is whether the user for whom the interaction is being analyzed initiated the interaction or received it. Generally the max_value for an interaction is higher if the user for whom the interaction is being analyzed is the sender or initiator of the interaction. For example, as between User 1 writing on User 2's wall and User 2 writing on User 1's wall, when determining interaction scores for User 1, the interaction score is higher for User 1 writing on User 2's wall than if User 2 writes on User 1's wall.

Returning to FIG. 3, the interaction scores for each individual interaction between the user and a given other user are combined to give the friend score 315. Typically the scores are combined as a sum. If the user of Example 3 had four other interactions with the friend to whom the user had sent the invite and those individual interactions had interaction scores of 2.62, 3.2, 2.5 and 3.3, the friend score would be 2.38+2.62+3.2+2.5+3.3=14.

Upon determining friend scores for all of a user's friends, a ranking of the user's friends is determined. In one embodiment, the ranking is accomplished by determining 320 the percentile ranking of each friend relative to all of the friends. A friend rank is then assigned 325 to all friends within a given percentile. One example of percentiles mapping onto friend ranks is as follows:

| Percentile (x) | Friend Rank |
| --- | --- |
| $x \geq 80^{th}$ | 5 |
| $60^{th} \leq x < 80^{th}$ | 4 |
| $40^{th} \leq x < 60^{th}$ | 3 |
| $20^{th} \leq x < 40^{th}$ | 2 |
| $x < 20^{th}$ | 1 |

In one embodiment, all of the user's friends with whom the user has not interacted except to become friends are automatically assigned friend rank 1.

After determination of the friend rank, the result is a list of the user's friends each with a friend rank wherein a higher friend rank indicates that that friend has more influence over the user.

There may be applications however for which it would be useful to sort a user's friends based on more than just the interaction score. For example, if an advertiser seeks to present a user with an advertisement related to one of the user's interests, it would be useful to know which of the user's friends is most influential to the user within the subgroup of the user's friends who share that particular interest. This objective is accomplished by applying a context to the interaction scores prior to determining the friend rank.

In order to apply a context to the interaction score, the level of interest of the user's friends in that context is determined from the information stored about the friends. Information about users is stored in the user database 243. Information stored includes browsing history, ad clicks, the number of friends the user has, frequency of internet use, number of unique sites viewed, and where the user is located. Additionally, the interactions in which a user has taken part are analyzed. For example, the noun and verb of an interaction are analyzed for keywords that provide a topical context. Additionally or alternatively, interactions of that user are analyzed not just in isolation, but also in aggregate. The top friend designation is an example. If User A has designated User B as a top friend that is one interaction. A second interaction could be that User B has also designated User A as a top friend. That the two users have mutually identified each other as top friends indicates that they are closer than either interaction taken in isolation would indicate.

A context may be applied using any information stored about a user. If for example an advertiser wanted to advertise a new word game to a user, the context could be word games. The interest of the user's friends in word games could be determined by how many word game applications each of the friends had installed as part of their account at the social network site. The interaction scores or the friend scores of the user's friends could then be adjusted based on how many word games the friend had installed. This could be accomplished any number of ways including by adding a booster score to the friend score of friends with over a threshold number of word games installed or just to the friend with the most word games installed; by applying a multiplier to the interaction scores of interactions that originated in word games, etc. The process of determining percentiles and friend ranks as described previously in reference to FIG. 3 is then applied to the adjusted friend scores. The result would be a list of the user's friends identifying those most influential within the context of word games. This process could be repeated for any context about which the system stores user information, including social contexts, such as perceived popularity and attractiveness.

The resulting friend scores and friend ranks in multiple contexts as well as without any context are stored in the friend rank database 135. The friend rank computed by the friend rank analysis engine may operate asynchronously from the process of choosing and displaying an ad to a user. The friend rank may be pre-computed at pre-determined intervals (e.g. once every 24 hours, once a week or once a month) or computed real time from sufficient statistics.

Process Flow

The process that takes place to display an ad to a user will now be described in reference to the same FIG. 1. A user visits a website and the browser at the client 110 requests an ad. The ad rank computation and selection engine 155 requests the user's overall score s(U) from the user scores database 125, the friend ranks for the user's friends from the friend rank database 135 as well as ads from the ad database 150. The stored friend ranks were determined as described previously in reference to FIGS. 2-5. As described previously in reference to the system architecture, the ad rank computation and selection engine 155 determines which ad to send to the user and sends the chosen ad to the user's browser at the client 110. The user's interaction with that ad is logged at the interaction receiving engine 165.

Depending on the type of ad being selected, the ad rank computation and selection engine 155 may request the friend ranks for a user within a context, such as interest in word games, as described previously, if the subject of the ad will be word games. Alternatively, the ad rank computation and selection engine 155 may request the friend ranks without any context if the ad being presented is of such a nature that it is enough to portray the friend that is generally most influential. Additionally, the ad rank computation and selection engine 155 may request the friend ranks without context if no friend ranks are available in a context that is related to the subject matter of the ad.

Additionally or alternatively, the ad rank computation and selection engine 155 analyzes stored friend ranks for multiple users to determine which rank of friends are most influential for a given advertisement. Which ranks of friends are most influential for a given advertisement is determined by the click through rate multiplied by the conversion rate. For example, given lists in contexts A, B, C and friend ranks 1, 2, 3, 4, 5 in each, it may be such that friend rank 5 in context A performs the best across all users. If the user for whom the ad is being selected has a friend of rank 5 in the context A, that friend is chosen to be portrayed in the ad. If not, the ad rank computation and selection engine 155 analyzes the user's friends for a friend of a next best performing rank and context.

This analysis of all users is useful because for a given ad, there are multiple contexts and the analysis provides guidance as to which context and which rank of friend would be most influential for that particular ad. For example, if the ad is for a luxury car, the ad could portray a friend of rank 5 in the context of car buffs. However, analysis may show that for a luxury car ad to be shown to a male user, the most influential friend to portray may be a woman and may be a woman with whom the user otherwise does not have many interactions, and thus has friend rank less than 5.

Example Interfaces and Interactions

FIGS. 6a-6f illustrate example interfaces corresponding to interactions with the system as described herein. These interfaces are presented to the user by the server 100 via the browser at the client 110. The example interaction illustrated is an advertisement presented to a user that portrays one of the user's friends. To determine which friend to portray in the advertisement, the ad rank computation and selection engine 155 used information from the friend rank database 135. The friend ranks stored in the friend rank database were determined as described previously.

Figure 6A:
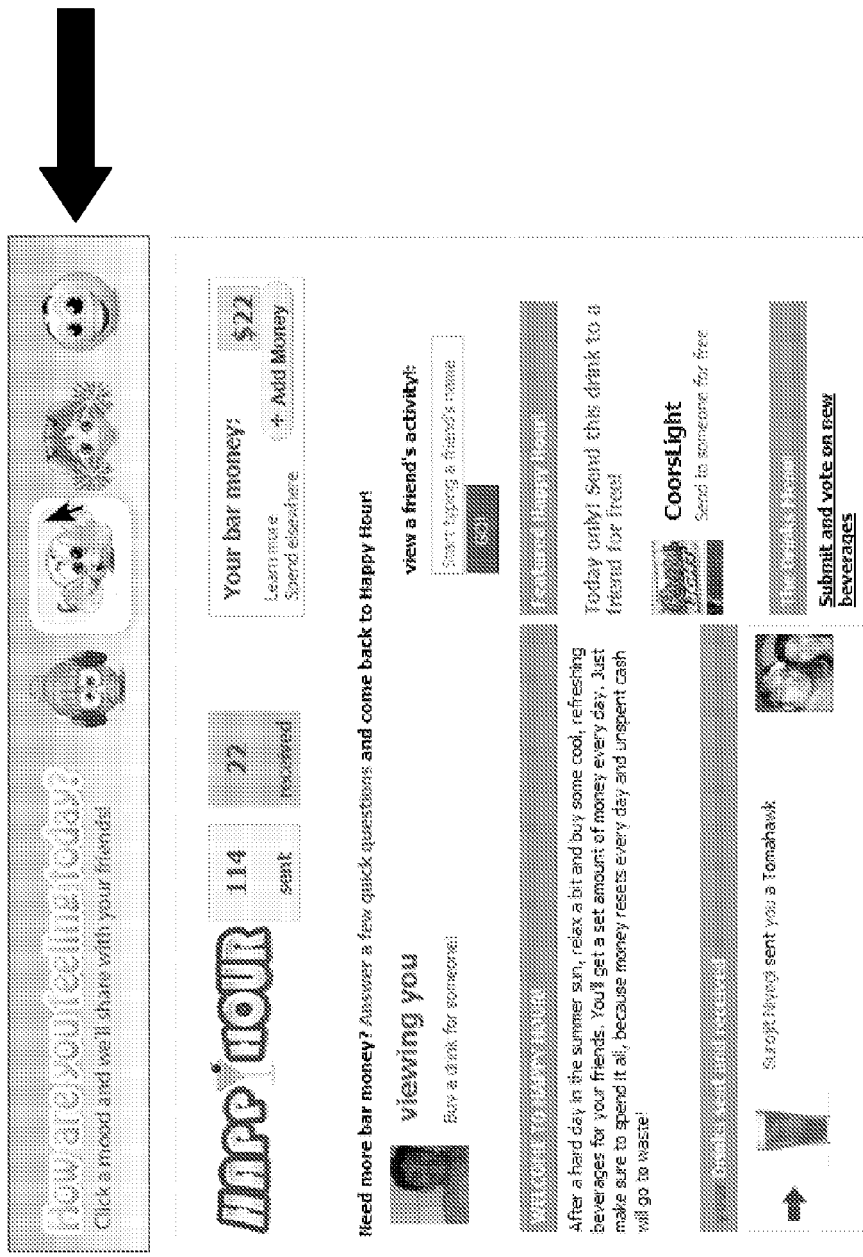
FIG. 6a illustrates a screenshot of a user interface displaying an advertisement to a first user according to one embodiment.

FIG. 6a illustrates a screenshot of a user interface displaying an advertisement to a first user according to one embodiment. The advertisement invites the first user to respond to the question about how the first user is feeling today. The first user chooses mood icon as a response and that response is transmitted to the system and stored in the log database 115.

Figure 6B:
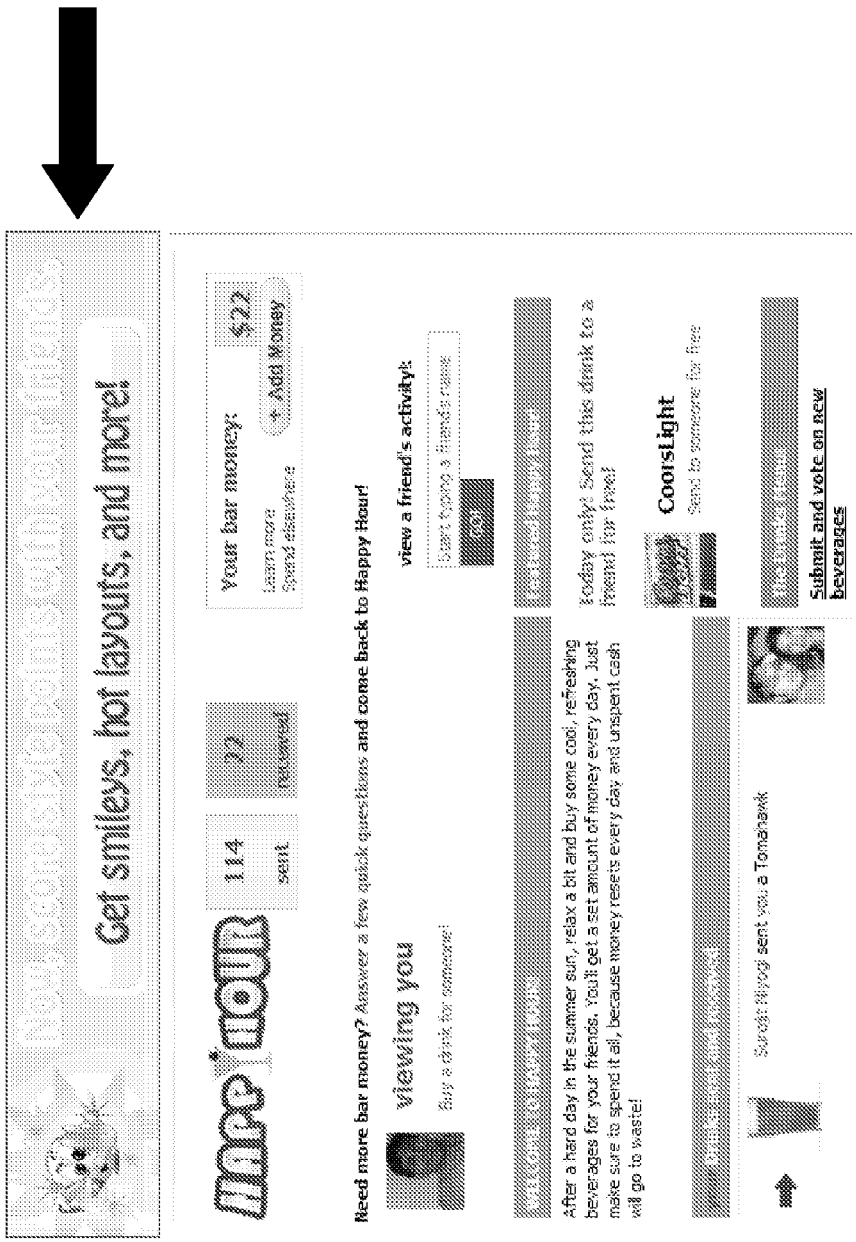
FIG. 6b illustrates a screenshot of a user interface, according to one embodiment, displaying the interface after the first user has interacted with the advertisement.

FIG. 6b illustrates a screenshot of a user interface, according to one embodiment, displaying the interface after the first user has interacted with the advertisement. The advertisement reflects the first user's choice of mood and invites the first user to click through the advertisement to the advertiser's site. The clicking through by the first user to the advertiser's site is stored in the log database 115.

Figure 6C:
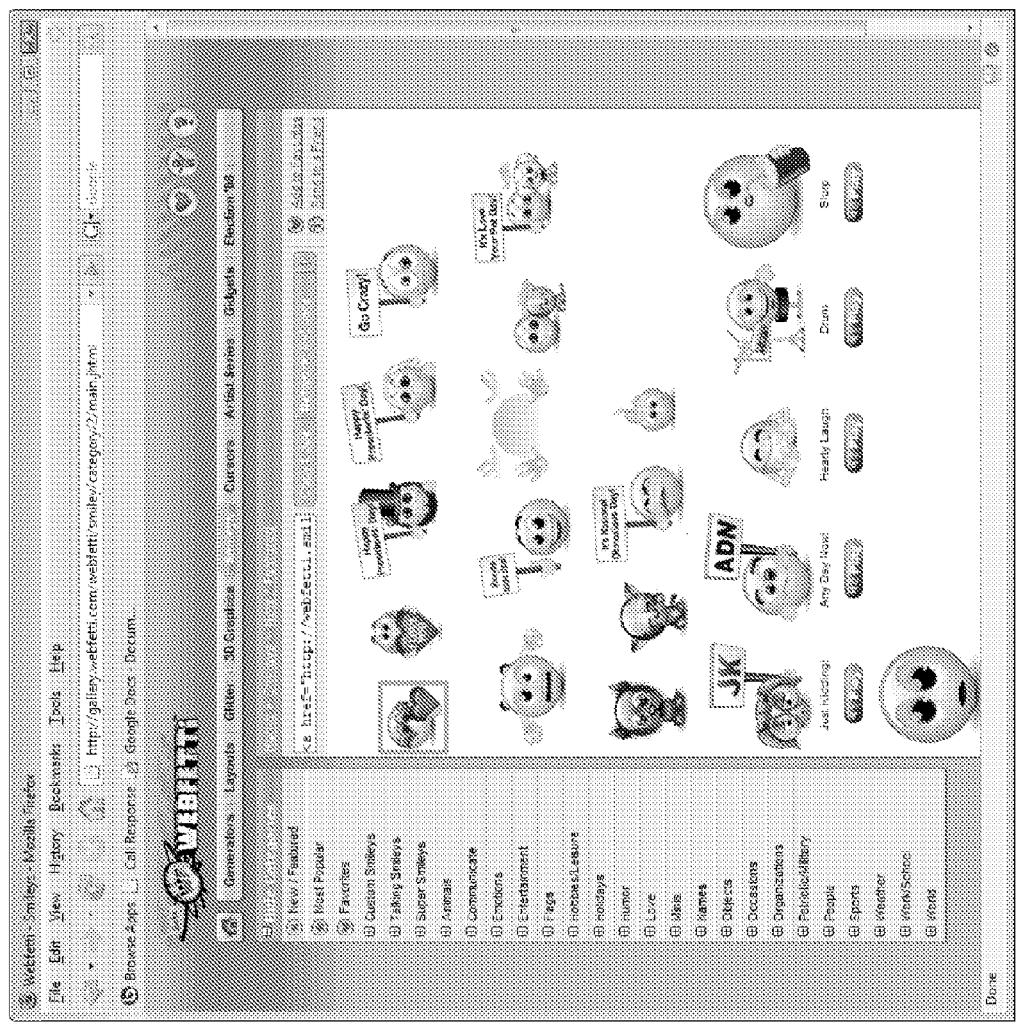
FIG. 6c illustrates a screenshot of a user interface, according to one embodiment, displaying the advertiser's site as it appears after the first user has clicked through the advertisement.

FIG. 6c illustrates a screenshot of a user interface, according to one embodiment, displaying the advertiser's site as it appears after the first user has clicked through the advertisement. The first user's interactions with the advertiser's site, including for example, purchases, are stored in the log database 115

Figure 6D:
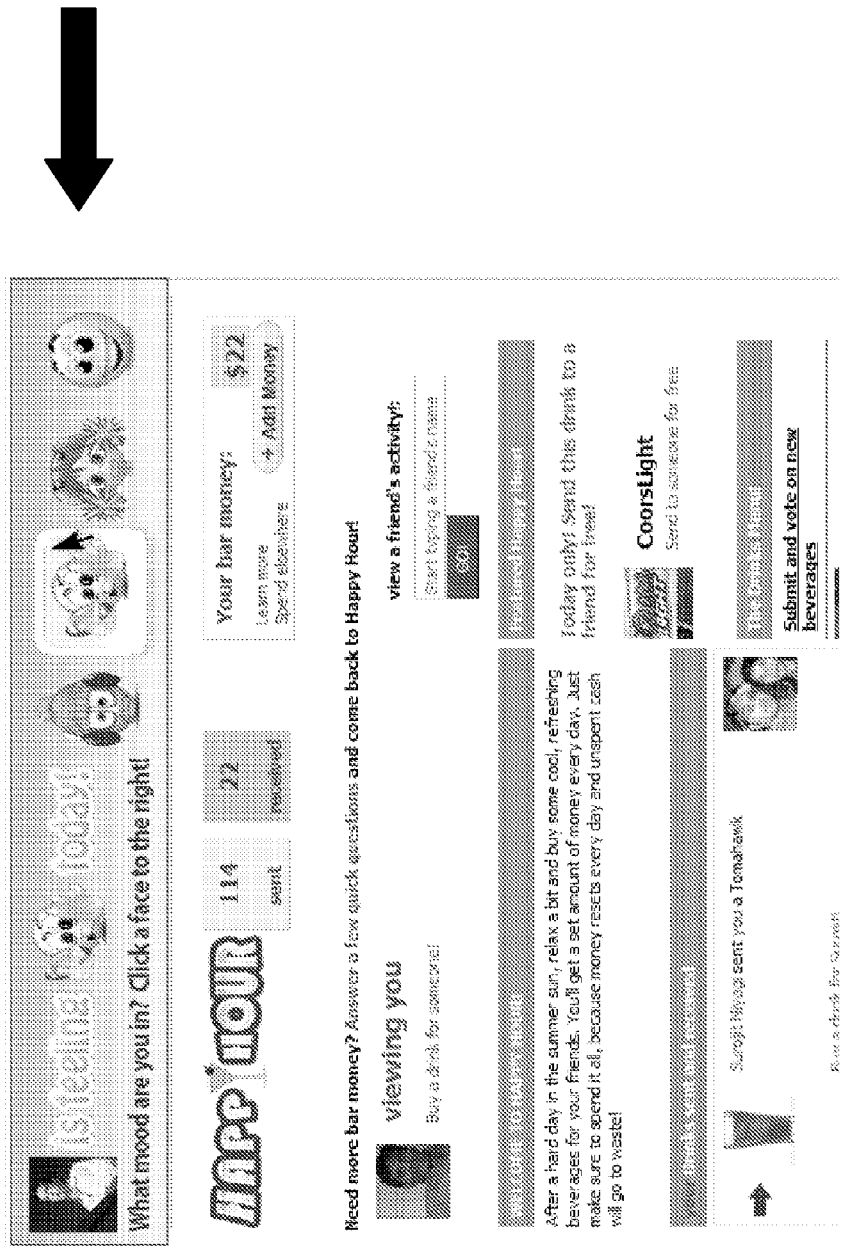
FIG. 6d illustrates a screenshot of a user interface, according to one embodiment, displaying to a second user an advertisement portraying the first user.

FIG. 6d illustrates a screenshot of a user interface, according to one embodiment, displaying to a second user an advertisement portraying the first user. When the second user opened a web browser, the system according to the process flow described in reference to FIG. 1, determined an advertisement to display and determined a friend of the second user to portray in the advertisement. In this example, the friend of the second user is the first user. The second user is told how the friend, first user, is feeling. The second user is then invited to select an icon that illustrates the second user's mood. When the second user does so, the response is sent to the system and stored in the log database 115.

Figure 6E:
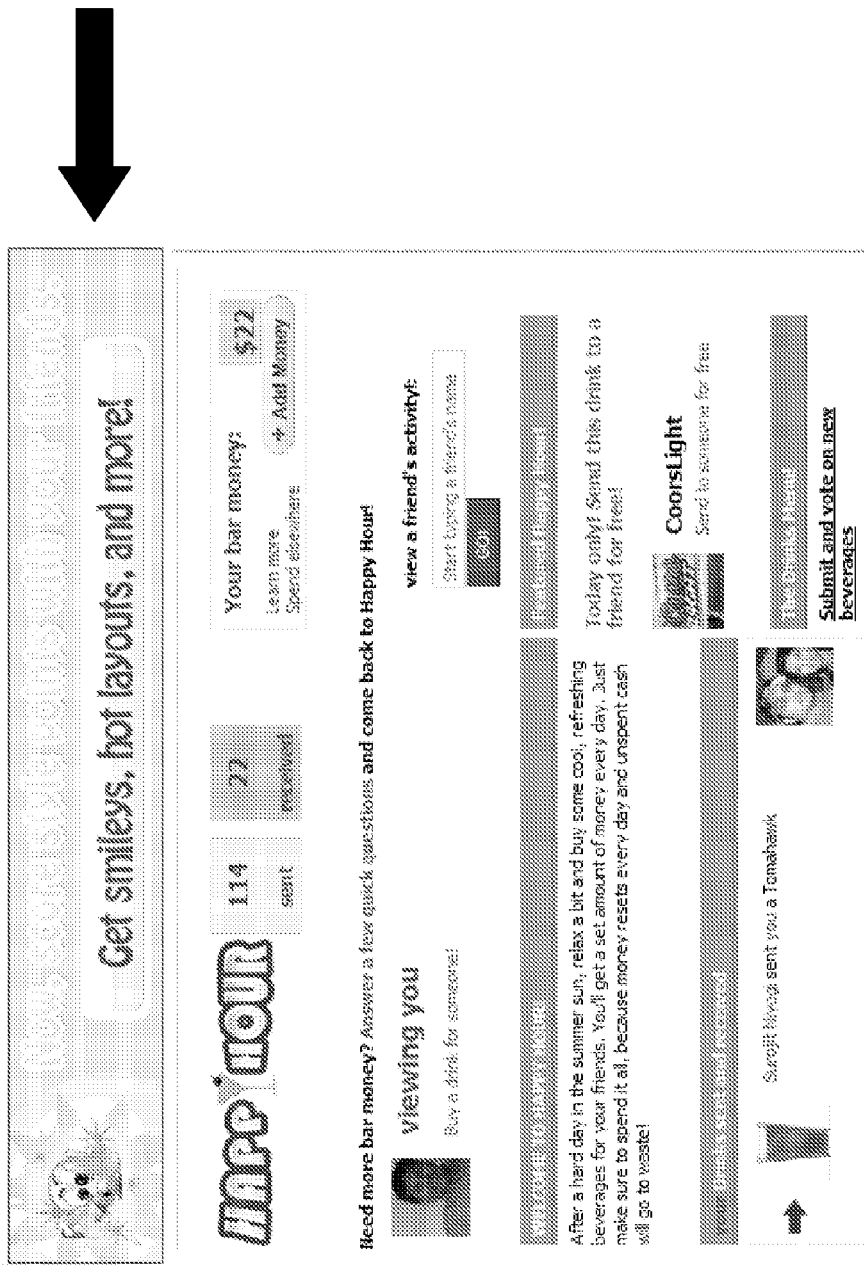
FIG. 6e illustrates a screenshot of a user interface, according to one embodiment, displaying the interface after the second user has interacted with the advertisement.

FIG. 6e illustrates a screenshot of a user interface, according to one embodiment, displaying the interface after the second user has interacted with the advertisement. The second user is now invited to click through to the advertiser's site.

Figure 6F:
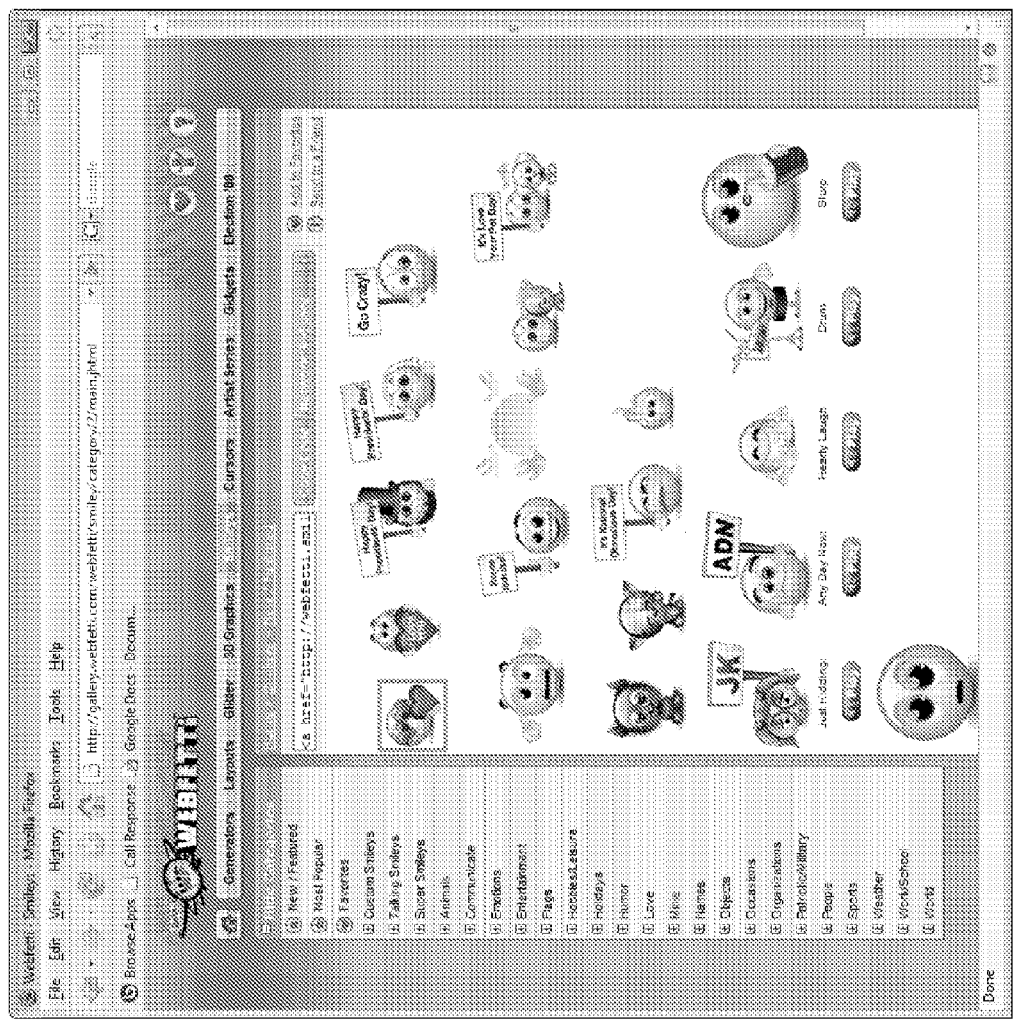
FIG. 6f illustrates a screenshot, according to one embodiment, of a user interface displaying the advertising web site displayed to the second user after the user has clicked through the advertisement.

FIG. 6f illustrates a screenshot, according to one embodiment, of a user interface displaying the advertising web site displayed to the second user after the user has clicked through the advertisement. The second user's interactions with the advertiser's site, including purchases, for example, are stored in the log database 115.

The disclosed system and method have been described with examples that reference the social networks FACEBOOK™ and MYSPACE™. It is contemplated however that the system and method are applicable at other social networks and throughout social media.

Figure 7:
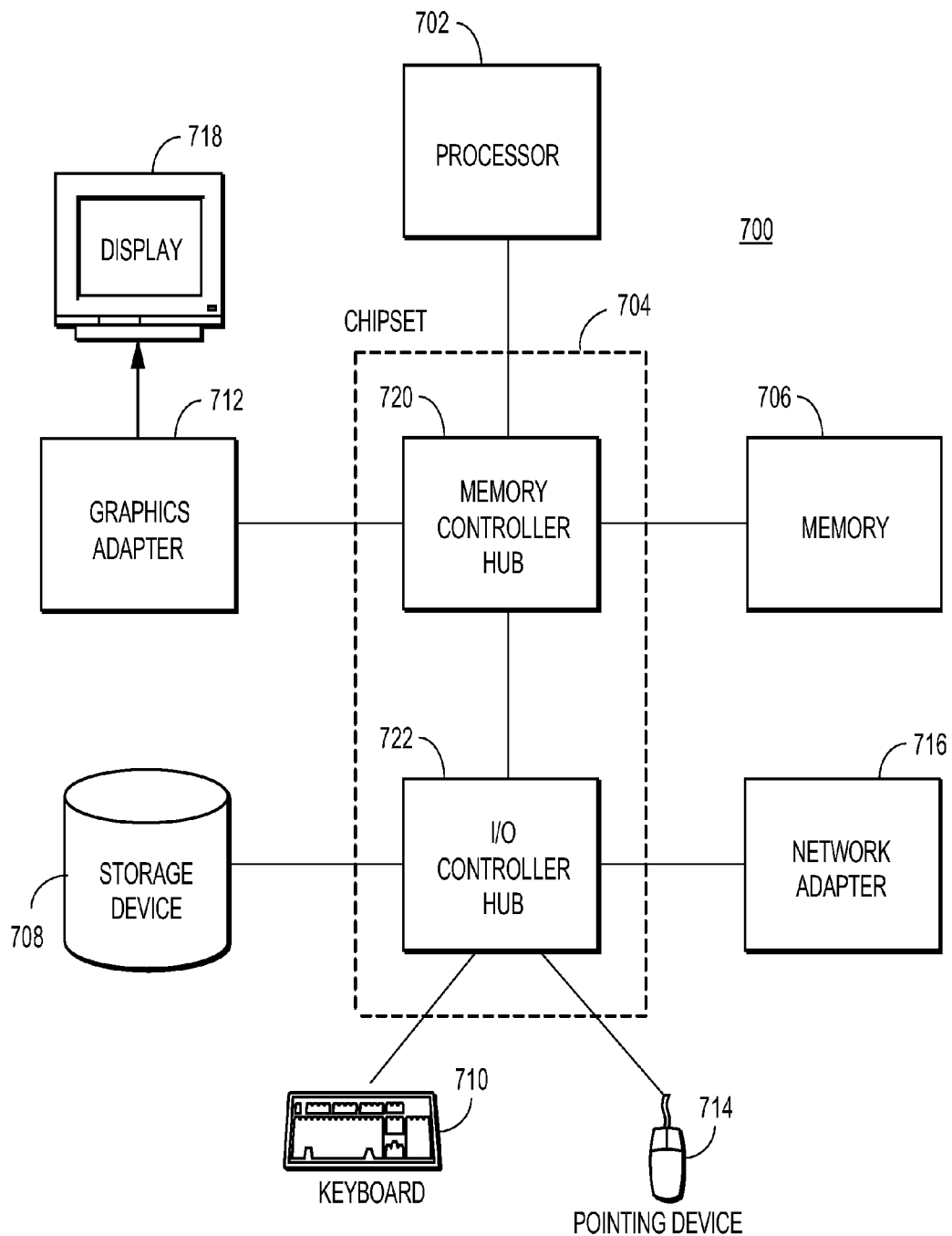
FIG. 7 is a high-level block diagram of a computer 700.

The disclosed system and method, including the process described in reference to FIG. 1 as well as the determination of quality of friends in reference to FIGS. 2-5, have been described, in reference to a computing system. FIG. 7 is a high-level block diagram of a computer 700. Illustrated are at least one processor 702 coupled to a chipset 704. Also coupled to the chipset 704 are a memory 706, a storage device 708, a keyboard 710, a graphics adapter 712, a pointing device 714, and a network adapter 716. A display 718 is coupled to the graphics adapter 712. In one embodiment, the functionality of the chipset 704 is provided by a memory controller hub 720 and an I/O controller hub 722. In another embodiment, the memory 706 is coupled directly to the processor 702 instead of the chipset 704.

The storage device 708 is any device capable of holding data, like a hard drive, compact disk read-only memory (CD-ROM), DVD, or a solid-state memory device. The memory 706 holds instructions and data used by the processor 702. The pointing device 714 may be a mouse, track ball, or other type of pointing device, and is used in combination with the keyboard 710 to input data into the computer system 700. The graphics adapter 712 displays images and other information on the display 718. The network adapter 716 couples the computer system 700 to a local or wide area network.

As is known in the art, a computer 700 can have different and/or other components than those shown in FIG. 7. In addition, the computer 700 can lack certain illustrated components. In one embodiment, a computer 700 lacks a keyboard 710, pointing device 714, graphics adapter 712, and/or display 718. Moreover, the storage device 708 can be local and/or remote from the computer 700 (such as embodied within a storage area network (SAN)).

As is known in the art, the computer 700 is adapted to execute computer program engines (or modules) for providing functionality described herein. As used herein, the term "engine" refers to computer program logic utilized to provide the specified functionality. Thus, an engine can be implemented in hardware, firmware, and/or software. In one embodiment, program engines are stored on the storage device 708, loaded into the memory 706, and executed by the processor 702.

Embodiments of the entities described herein can include other and/or different engines than the ones described here. In addition, the functionality attributed to the engines can be performed by other or different engines in other embodiments. Moreover, this description occasionally omits the term "engine" for purposes of clarity and convenience.

Further, the features and advantages described in the specification provide a beneficial use to those making use of a system and a method as described in embodiments herein. For example, a user is provided mechanisms, e.g., by receiving and/or transmitting control signals, to control access to particular information as described herein. Further, these benefits accrue regardless of whether all or portions of components, e.g., server systems, to support their functionality are located locally or remotely relative to the user.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

In addition, some portions of the detailed description are presented in terms of algorithms and symbolic representations of operations on data bits within a computer memory, for example, the process described in reference to FIG. 1 as well as the determination of quality of friends in reference to FIGS. 2-5. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as engines or code devices, without loss of generality.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative systems and methods for targeting content to users on the Internet using data captured by social media in accordance with the disclosed principles herein. Thus, while particular embodiments and applications have been illustrated and described, it is to be understood that the embodiments are not limited to the precise construction and components disclosed herein and that various modifications, changes and variations which will be apparent to those skilled in the art may be made in the arrangement, operation and details of the method and apparatus disclosed herein without departing from the spirit and scope of the disclosure and appended additional claimable subject matter.

We claim:

1. A method performed on a computer system for ranking influence of users of the internet on other users of the internet based on interactions between the users comprising:
receiving information indicative of an interaction between a first user and a second user;
determining an interaction score for the interaction, wherein the interaction score is based at least in part on a type of the interaction;

determining a friend rank for the second user based on the interaction score, wherein the friend rank indicates a measure of a degree of influence the second user has over the first user; and storing the friend rank in a storage medium for subsequent retrieval to promote selection of content to serve to the first user.

2. The method of claim 1, further comprising storing the received information indicative of the interaction in the storage medium.

3. The method of claim 1, further comprising:
receiving a request for an advertisement to display to the first user;
selecting an advertisement for the first user based on friend ranks for each of the second user and a plurality of third users; and
transmitting, to a client device, the selected advertisement.

4. The method of claim 1, wherein the received information indicative of the interaction comprises metadata associated with the interaction.

5. The method of claim 1, wherein the interaction score is further based on one or more of an age of the interaction or a period of time between the interaction and another interaction between the first user and the second user.

6. The method of claim 1, wherein determining the interaction comprises serializing the interaction.

7. The method of claim 1, further comprising:
determining an interaction score percentile for the second user, wherein the interaction score percentile specifies an amount of interaction between the first user and the second user relative to other amounts of interaction between the first user and other users; and
determining that the interaction score percentile satisfies a threshold interaction score percentile;
wherein determining the friend rank comprises:
based on determining that the interaction score percentile satisfies the threshold interaction score percentile, determining the friend rank.

8. A system comprising:
one or more processors; and
one or more machine readable hardware storage devices storing instructions that are executable by the one or more processors to perform operations comprising:
receiving information indicative of an interaction between a first user and a second user;
determining an interaction score for the interaction, wherein the interaction score is based at least in part on a type of the interaction;
determining a friend rank for the second user based on the interaction score, wherein the friend rank indicates a measure of a degree of influence the second user has over the first user; and
storing the friend rank in a storage medium for subsequent retrieval to promote selection of content to serve to the first user.

9. The system of claim 8, wherein the operations further comprise storing the received information indicative of the interaction in the storage medium.

10. The system of claim 8, wherein the operations further comprise:
receiving a request for an advertisement to display to the first user;
selecting an advertisement for the first user based on friend ranks for each of the second user and a plurality of third users; and
transmitting, to a client device, the selected advertisement.

11. The system of claim 8, wherein the received information indicative of the interaction comprises metadata associated with the interaction.

12. The system of claim 8, wherein the interaction score is further based on one or more of an age of the interaction or a period of time between the interaction and another interaction between the first user and the second user.

13. The system of claim 8, wherein determining the interaction comprises serializing the interaction.

14. The system of claim 8, wherein the operations further comprise:
determining an interaction score percentile for the second user, wherein the interaction score percentile specifies an amount of interaction between the first user and the second user relative to other amounts of interaction between the first user and other users; and
determining that the interaction score percentile satisfies a threshold interaction score percentile;
wherein determining the friend rank comprises:
based on determining that the interaction score percentile satisfies the threshold interaction score percentile, determining the friend rank.

15. One or more machine readable hardware storage devices storing instructions that are executable by one or more processors to perform operations comprising:
receiving information indicative of an interaction between a first user and a second user;
determining an interaction score for the interaction, wherein the interaction score is based at least in part on a type of the interaction;
determining a friend rank for the second user based on the interaction score, wherein the friend rank indicates a measure of a degree of influence the second user has over the first user; and
storing the friend rank in a storage medium for subsequent retrieval to promote selection of content to serve to the first user.

16. The one or more machine readable hardware storage devices of claim 15, wherein the operations further comprise storing the received information indicative of the interaction in the storage medium.

17. The one or more machine readable hardware storage devices of claim 15, wherein the operations further comprise:
receiving a request for an advertisement to display to the first user;
selecting an advertisement for the first user based on friend ranks for each of the second user and a plurality of third users; and
transmitting, to a client device, the selected advertisement.

18. The one or more machine readable hardware storage devices of claim 15, wherein the received information indicative of the interaction comprises metadata associated with the interaction.

19. The one or more machine readable hardware storage devices of claim 15, wherein the interaction score is further based on one or more of an age of the interaction or a period of time between the interaction and another interaction between the first user and the second user.

20. The one or more machine readable hardware storage devices of claim 15, wherein determining the interaction comprises serializing the interaction.

21. The one or more machine readable hardware storage devices of claim 15, wherein the operations further comprise:
determining an interaction score percentile for the second user, wherein the interaction score percentile specifies an amount of interaction between the first user and the second user relative to other amounts of interaction between the first user and other users; and determining that the interaction score percentile satisfies a threshold interaction score percentile;

wherein determining the friend rank comprises:

based on determining that the interaction score percentile satisfies the threshold interaction score percentile, determining the friend rank.

\* \* \* \* \*